United States Patent
Baker

(10) Patent No.: US 12,198,319 B2
(45) Date of Patent: Jan. 14, 2025

(54) SYCLOPS

(71) Applicant: Ronald Baker, Alpharetta, GA (US)

(72) Inventor: Ronald Baker, Alpharetta, GA (US)

( * ) Notice: Subject to any disclaimer, the term of this patent is extended or adjusted under 35 U.S.C. 154(b) by 238 days.

(21) Appl. No.: 17/313,049

(22) Filed: May 6, 2021

(65) Prior Publication Data
US 2021/0350525 A1 Nov. 11, 2021

Related U.S. Application Data

(60) Provisional application No. 63/021,546, filed on May 7, 2020.

(51) Int. Cl.
| | |
|---|---|
| *G06T 7/00* | (2017.01) |
| *G01N 21/88* | (2006.01) |
| *G06N 20/00* | (2019.01) |
| *G06V 20/64* | (2022.01) |

(52) U.S. Cl.
CPC ....... *G06T 7/0004* (2013.01); *G01N 21/8851* (2013.01); *G06N 20/00* (2019.01); *G06V 20/64* (2022.01); *G01N 2021/8864* (2013.01); *G06T 2207/30148* (2013.01)

(58) Field of Classification Search
CPC .... G01H 20/10; G06K 9/344; G06K 2209/05; G06T 7/0012; H04L 9/0643; H04L 9/0637; H04L 2209/38
USPC ...................... 356/237.1–237.5, 71; 382/141
See application file for complete search history.

(56) References Cited

U.S. PATENT DOCUMENTS

| | | | |
|---|---|---|---|
| 7,940,396 B2 * | 5/2011 | Nisper | G01J 3/504 356/402 |
| 8,970,828 B1 * | 3/2015 | Fraser | G06V 10/147 356/71 |
| 2019/0272908 A1 * | 9/2019 | Hill | H04L 9/3239 |
| 2023/0230054 A1 * | 7/2023 | Livesay | G06Q 20/02 705/39 |

* cited by examiner

*Primary Examiner* — Hoa Q Pham
(74) *Attorney, Agent, or Firm* — Ronald Baker, Esq.; BAKER & CO. PATENT LAW GROUP

(57) ABSTRACT

The present invention is an imaging system which includes an optional hand-held mobile device and software application that allows a user to scan and communicates data to secured third parties. The embodiment allows such devices to transmit and receive critical imaging information. The SYCLOPS™ system will provide statistical data analysis and broadcast secured information to users in a manner that have not been previously utilized.

8 Claims, 3 Drawing Sheets

SYCLOPS

CROSS-REFERENCE TO RELATED APPLICATIONS

The present application claims priority to the earlier filed provisional application having Ser. No. 63/021,546, and hereby Incorporates subject matter of the provisional application in its entirety.

TRADEMARK NOTICE

A portion of the disclosure of this patent document contains material which is subject to trademark protection. Trademarks are the property of their respective owners.

BACKGROUND OF THE INVENTION

Field of the Art

The disclosure relates to an imaging system that provides a novel way of detecting counterfeit parts and surveillance for data violation as a result of such acts. More particularly the invention is an imaging system that utilizes a software application that allows users to scan the features of an electronic part and determine if the part is counterfeit or poses a high risk for counterfeit. The embodiment also allows for a method of cross referencing the data to information source by integrating with existing secured technology to perform a statistical analysis on the likelihood of greater threat once the electronic component is installed in a critical network of devices and or system.

Discussion of the State of the Art

The electronics industry is a lucrative industry that requires an extensive supply chain to ensure a pipe line of authenticated parts. While manufacturing electronic parts, professionals rely on verified parts and strong prevention campaign against counterfeit parts. In the private sector, industries such as automotive and commercial aircraft heavily depend on critical parts to keep people safe. Professionals such as Quality Engineers manage supply chain procedures to ensure safety and reliable parts by performing periodical vendor audits. Additionally, officials who represent the Department of Defense (DOD) have worked to prevent malicious activity that can leave military personnel and civilians at serious risk. Realistically, the magnitude of the current challenge associated with inspecting every part for counterfeit characteristics is too broad, complex and expensive to effectively perform. Electrical devices, particularly those operating in defense settings such as satellites, are particularly critical to protect the health and wellbeing of the general public as well as our military personnel. Similarly, electronic equipment (e.g. computers, servers, circuit chips, switch boards, power supply equipment, etc.) vehicles, industrial prime movers, household equipment and the like often are infiltrated with counterfeit parts.

As it stands, any number of vulnerabilities could be placed virtually anywhere throughout the manufacturing process and supply chain, causing the systems to operate less than optimal thus building the wrong component parts or delivering parts to the wrong destination. Mitigating or stopping this will require a systematic approach instead of a spot solution that tend to predominate. Furthermore, malware that enables misleading location data could be in a GPS receiver, for example, or in a timing component, causing a device or network to lose vital synchronization or control data.

Traditionally, counterfeit electronic parts enter a supply chain through third party vendors who have not been verified or through a distribution of vendors who make aftermarket parts in black market countries. Often these parts look very much like the original parts that are made by the Original Chip Makers (OCM) for instance. Once these parts are installed in a downstream component then this can have a significant impact on the component that can cause degradation to occur at a specific time or degree of usage, and could be either subtle or sudden.

Accordingly, what is needed in the art is an embodiment and system to mitigate the risk associated with counterfeit parts, intellectual property, and data violation. What is further needed in the art is an embodiment that can be transported to various locations with the intent of assisting users at determining specific features of counterfeit parts and the risk that they pose to a greater component. What is further needed in the art is a reliable system that will cross-reference associated data with identifiable counterfeit features via integration with existing secured technology to perform statistical analysis to determine a greater threat. What is further needed is a system that will communicate such threats to data owners.

SUMMARY OF THE INVENTION

Embodiment described herein relate generally to systems, methods, and computer-readable media for identifying counterfeit electronic parts using imaging, and particularly to systems for capturing 3-dimensional images of electronic parts such as circuit chips. Accordingly, the inventor has conceived, in a preferred embodiment of the invention, a software application system that can be used on a mobile device for scanning physical features and collecting data associated with electronic components for identifying counterfeit parts and mitigating risk.

According to a preferred embodiment of the invention, a mobile device application system for providing a novel manner to prevent compliance risk among critical components. The embodiment includes a vision software that can be utilized on a designated mobile device that can be focused on a suspect counterfeit part to collect data. Further according to the embodiment, vision software, allows the installed software application to be downloaded on designated mobile devices. In an ideal embodiment, the vision software will target various suspect features and identify data violations simultaneous by utilizing artificial intelligence to cross-reference data.

BRIEF DESCRIPTION OF THE DRAWING FIGURES

The accompanying drawings illustrate several embodiments of the invention and, together with the description, serve to explain the principles of the invention according to the embodiments.

It will be appreciated by one skilled in the art that the particular embodiments illustrated in the drawings are merely exemplary and are not to be considered as limiting of the scope of the invention or the claims herein in any way.

Figure 1:
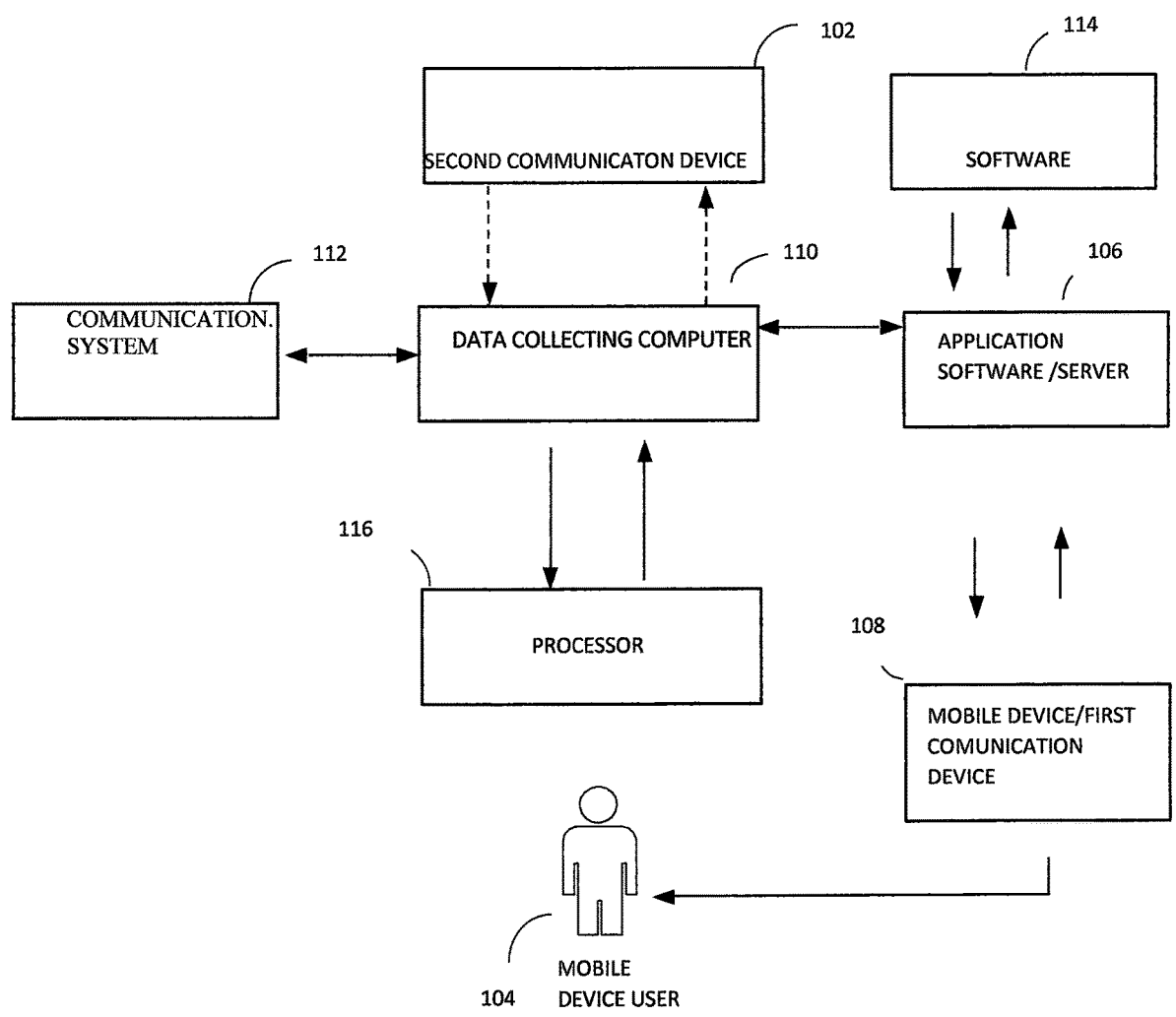
FIG. 1 is a system diagram for an exemplary system configuration consistent with certain embodiments of the present invention.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

A description of an embodiment with several components in connection with each other does not imply that all such components are required. To the contrary, a variety of optional components may be described to illustrate a wide variety of possible embodiments of one or more of the inventions and in order to more fully illustrate one or more aspects of the inventions.

Definitions

Data Controller is an entity that controls the procedures and purpose of data usage.

Data Processor is a person or organization who deals with personal data as instructed by a controller for specific purposes and services offered to the controller that involve personal data processing.

Reference throughout this document to a first communication device refers to a variety of components that operates using any means of internet connection or similar modem that transmits packets of data that allow smart devices (such as phones, tablets, computers, handheld devices, smart watches, game devices, etc.) to be updated when they receive data. The ability of a mobile device to collect such data is important when compiling critical information to relay to the user.

Reference throughout this document to a second communication device refers to a variety of components that operates using any means of internet connection or similar modem that transmits packets of data that allow the Data Collecting Computer to interface with the first communication device.

Secured technology refers to technology that has been verified by either the Department of Defense or other approved private organizations.

Data Subject refers to any individual person who can be identified, directly or indirectly, via an identifier such as an ID number, location data, or via factors specific to certain features.

Cross-referencing search assists in finding Analog Devices products that are equivalent, similar, substitute or alternate replacement to other Analog Device products or products of other manufacturers by integrating with existing secured technology.

Monitoring system is a network for inductively monitoring an existing system for failures where a system is not operating effectively.

DETAILED DESCRIPTION

Embodiments described herein relate generally to systems, methods, and computer-readable media for identifying features on counterfeit electronic parts using imaging, and particularly to imaging systems for capturing 3-dimensional images of counterfeit electronic parts to assist with making improvement changes to existing processes. The inventor has conceived, a system to detect counterfeit electronics and determine data violation held by both data controller and data processor. Further, the embodiment can be used to prevent system failures associated with processes that manufacture and support electronic parts, SYCLOPS™ will utilize 3-dimensional images and artificial intelligence in the field to assist with corrective actions as well as submitting needed data to end users to make such improvements.

In an exemplary embodiment, the SYCLOPS™ will serve as a system and tool for users who find it ideal to identify and prevent counterfeit electronics such as integrated circuits. The optional tool is ideally a mobile device that includes a software application useful for capturing images of a target object such as circuit chip. When the user identifies suspect parts through inspection or failure, the user will find it ideal to utilize the SYCLOPS™ application to scan features to determine the background and origin of the suspect part. The application will immediately provide the user with a convenient manner to quickly scan the suspect parts by using a mobile device and subsequent detection and confirmation for risk. The suspect component will need to be scanned at various angles to achieve optimal results for greater detection and data results.

Additionally, in a non-limiting example, the embodiment will provide Geo location for tracking the user who activates the SYCLOPS™ App. This feature is critical to increase response time for critical corrective action to prevent any further risk to the electronic system thus allowing SYCLOPS™ to submit critical data based on the GPS location of the failure. In an alternate embodiment, the SYCLOPS™ system may also integrate with existing components in the art to cross-reference a number of databases utilizing information received by utilizing 3 dimensional recognition and artificial intelligence technology. To elaborate, once the SYCLOPS™ system collects certain data based on feature characteristics of the part, the application data base will cross-reference the features against a combination known risk factors and existing technology. Such a database will provide critical research and statistical information for agencies such as Missile Defense Agency (MDA)

and NASA. The embodiment has far reaching benefits for assisting research and protecting critical defense electronics as well as commercial industry used for safety related products in Defense Systems for instance.

In an embodiment, the SYCLOPS™ App is comprised as a software application which can be downloaded to a user's mobile device. Once the mobile application is downloaded a user will be able to activate the SYCLOPS™ App by simply touching a downloaded icon on the screen of the mobile device which will allow the mobile device to operate as a handheld device.

Further according to the embodiment, the invention will include a broadcast system to send secured communications within a designated radius to associated controlled groups or soldiers in the case of military use who depend on such information to prevent failure to critical defense systems.

EXEMPLARY EMBODIMENTS

FIG. 1 is a system diagram for an exemplary system configuration consistent with certain embodiments of the present invention. A system for interfacing with data (100) and transmitting such data to a second communication device (102). A user may initiate the software system by utilizing the application software server (106). The SYCLOPS™ software server (106) stores the transmitted information data in the data collecting computer (110) containing all of the collected data, either automatically by the SYCLOPS™ system or include another acceptable manner in the known art. The software (114) executable via the processor (116) allows for statistical analysis of the likelihood of greater threat once the electronic component is installed in a critical network of devices and or system.

Figure 2:
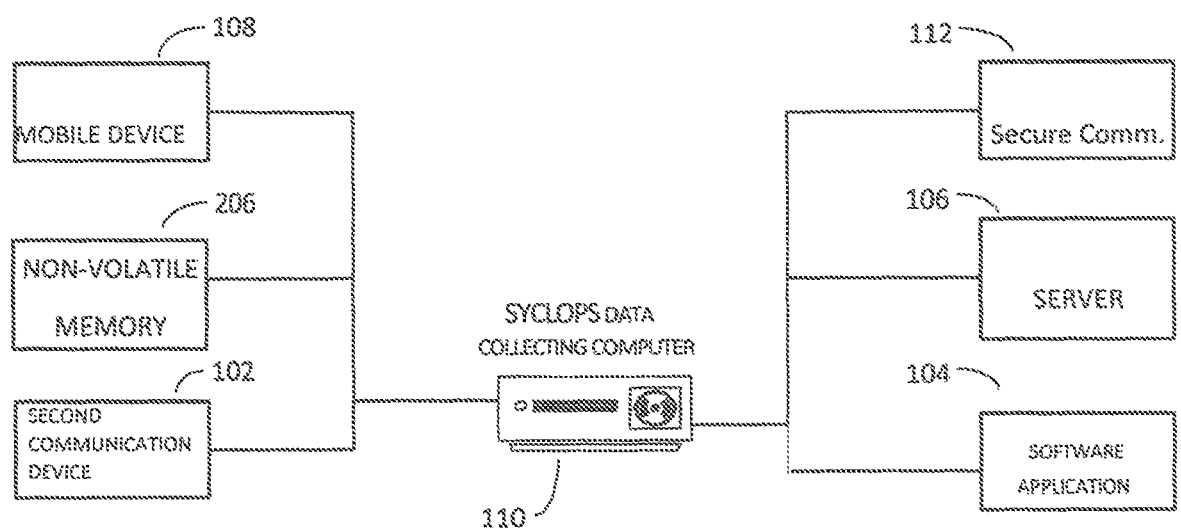
FIG. 2 is a system diagram for communicating with a mobile device consistent with certain embodiments of the present invention.

FIG. 2 is a system diagram for an exemplary system configuration (200) consistent with certain embodiments of the present invention. This figure presents a diagram for how a data collecting computer (110) will transmit and receive data between various components when the SYCLOPS™ system is operational. The mobile device (108) captures data and stores memory in a cache. (206) which continuously collects data from the software application (104). The collected data is submitted to a memory cache (206) and is maintained by a server (106). The mobile device (108) is in contact with a second communicating device (208) in a method of providing an enhanced experience for the overall Each mobile device (108) may have multiple software applications (104) installed on the mobile device (108) based upon a user's affiliation. The installed software application (104) to each mobile device (108) is connected to software application (104) associated with the mobile device (108). The affiliation assigned to the mobile device (108) can be retrieved for management and tracking of information.

Figure 3:
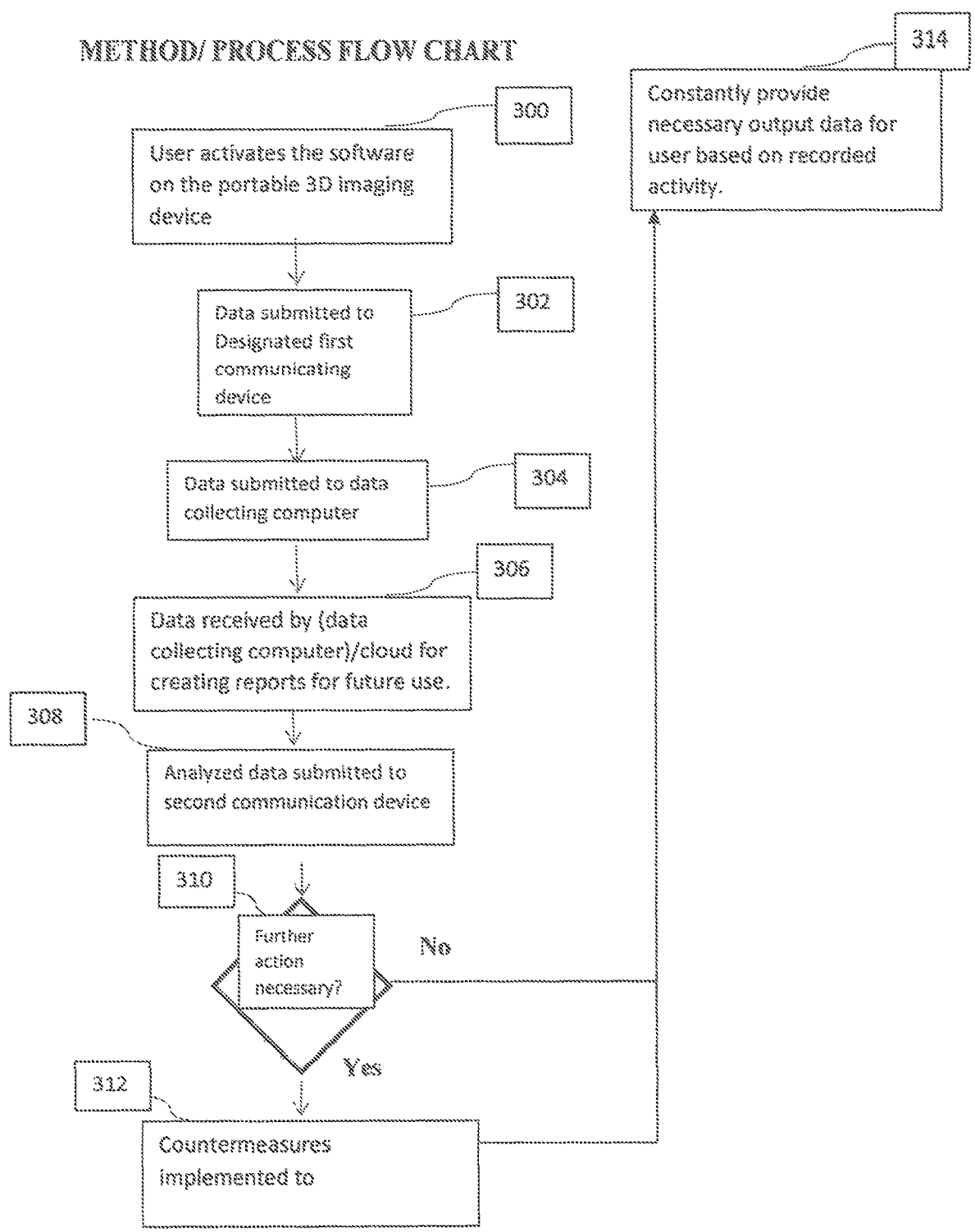
FIG. 3 is a process flow diagram for communicating with a mobile device consistent with certain embodiments of the present invention.

FIG. 3 is a process flow diagram for an exemplary system configuration consistent with certain embodiments of the present invention. This figure presents a flow diagram for how a data collecting computer (110) will transmit and receive data between various components when the SYCLOPS™ system is operational. At (300) the user (104) will activate the software on the portable 3D imaging device at (300) to capture imaging data from the target object. At (302) data is submitted to the first communication device (108). At (304) data is continuously submitted to the data collecting computer (110). At (306) collected data is submitted to a memory cache (206) and is maintained by a server (212). At (308) the data collecting computer (110) is in contact with a monitoring system that serves as a second communication device in a method of analyzing whether or not an existing process is operating as expected. At (310) the SYCLOPS system will make a determination if countermeasures are necessary if it is determined that the process is not working optimal due to a breach or a virus in a network. At (314) the affiliation will constantly provide necessary output data for recorded activity. This affiliation is key in that the SYCLOPS™ system will accomplish multiple tasks to greatly assist in mitigating network failures associated with counterfeit parts which is indicative of poorly performing systems. When used during combat critical missions in the case of military use, the SYCLOPS™ will allow soldiers to travel with the SYCLOPS™ software application installed on a mobile device as a handheld tool to collect information by scanning parts and determining whether the part is counterfeit allowing avoidance of further damage which is indicative of poor system performance. As greater use, once the data is collected the SYCLOPS™ database can quickly ascertain where the counterfeit part was originated and allow the end user to assert corrective actions and replace existing parts if necessary, under critical circumstances. In a non-limiting example, the SYCLOPS™ system is driven by a computing device that collects scanned data and utilizes technology such as artificial intelligence to monitor existing processes for poorly performing systems by utilizing data. At (302), the application will transmit a URL link to the mobile device which will alert the software system of pending data transmission for the data collecting computer for purposes of allowing an affiliated first communication device to communicate with a second communication device. Furthermore, at (308) when the system is initiated, the data collecting computer 110 receives collected data from the second communication device which transmits data to the server 106. The server 106 stores the transmitted information data in the data collecting computer 110 containing all of the collected data, either automatically by the system or include another acceptable manner in the known art.

The skilled person will be aware of a range of possible modifications of the various embodiments described above. Accordingly, the present invention is defined by the claims and their equivalents.

What is claimed is:
1. An imaging system for submitting data, comprising;
   a data collecting computer comprising a processor and software, the software when executed by the processor causes the processor to:
   connect to a communication system;
   submit data;
   receive data from one or more mobile devices, the one or more mobile devices operable to transmit data; wherein if critical data is received, by the data collecting computer, from the at least one mobile device, the data collecting computer communicates to a first communication device and second communication device, via the communication system, after the processor has initiated communication, the data collecting computer;
   communicates, via the communication system, to a first communication device; and submits data to the first communication device;
   capture images of an electronic part by utilizing artificial intelligence when prompted by the a user, wherein the artificial intelligence uses object recognition to recognize surface features of the electronic part; and
   determine the counterfeit and defective features for reporting and corrective action purposes; wherein the software can perform statistical analysis for risk assess- ment for potential counterfeit activity; wherein said data collecting computer is operable to determine the origin of counterfeit parts.

2. The imaging system according to claim 1; wherein the one or more mobile devices include installed software application.

3. The imaging system according to claim 2; wherein the software application is further activated by the user's voice and touch.

4. The imaging system according to claim 3; wherein the software application can further cause the mobile device to scan physical surface features of a target objects.

5. The imaging system according to claim 1; wherein the data collecting computer further receives data from a the user's mobile device if the user does not send transmission to contacts within a designated time of two minutes after the system is activated.

6. The imaging system according to claim 1; wherein the data collecting computer further comprises a method of storing and submitting data to said second communication device.

7. The imaging system according to claim 1; wherein the software application is integrated to an existing monitoring applications to assess performance of a process.

8. A method of submitting critical data to a monitoring system, comprising:
providing a 3D imaging device for use for scanning, wherein the 3D imaging device comprises software; a user holding the 3D imaging device in a proximate location to capture a surface image of a target objects, a data collecting computer comprising a processor and software, the software when executed by the processor causes the processor to:
connect to a communication system;
submit data;
receive data from one or more mobile devices, the one or more mobile devices operable to transmit data; wherein if critical data is received, by the data collecting computer, from the at least one mobile device, the data collecting computer communicates to a first communication device and second communication device, via the communication system, after the processor has initiated communication, the data collecting computer;
communicates, via the communication system. to a first communication device; and submits data to the first communication device;
capture images of an electronic part by utilizing artificial intelligence when prompted by the a user, wherein the artificial intelligence uses object recognition to recognize surface features of the electronic part; and
determine the counterfeit and defective features for reporting and corrective action purposes; wherein the software can perform statistical analysis for risk assessment for potential counterfeit activity: wherein said data collecting computer is operable to determine the origin of counterfeit parts; wherein once the software is activated, the 3D imaging device will scan the surface of the target objects, wherein the image will be transmitted in a secure manner to a first communication device; wherein the image will be transmitted to a data collecting computer for analysis; wherein the data collecting computer will communicate the analyzed data to a monitoring system.

* * * * *